(12) United States Patent
Chen

(10) Patent No.: US 11,048,070 B2
(45) Date of Patent: Jun. 29, 2021

(54) VIRTUAL DISPLAY DEVICE

(71) Applicant: E-LEAD ELECTRONIC CO., LTD., Changhua (TW)

(72) Inventor: Stephen Chen, Changhua (TW)

(73) Assignee: E-LEAD ELECTRONIC CO., LTD., Changhua (TW)

( * ) Notice: Subject to any disclaimer, the term of this patent is extended or adjusted under 35 U.S.C. 154(b) by 516 days.

(21) Appl. No.: 15/840,741

(22) Filed: Dec. 13, 2017

(65) Prior Publication Data
US 2019/0107695 A1    Apr. 11, 2019

(30) Foreign Application Priority Data

Oct. 5, 2017  (TW) ................... 106214791
Oct. 27, 2017 (TW) ................... 106215870

(51) Int. Cl.
*G02B 17/06* (2006.01)
*G06F 1/16* (2006.01)
*G02B 7/182* (2021.01)

(52) U.S. Cl.
CPC ......... *G02B 17/0621* (2013.01); *G02B 7/182* (2013.01); *G06F 1/16* (2013.01); *G06F 1/1601* (2013.01); *G06F 1/1609* (2013.01); *G06F 1/1616* (2013.01); *G06F 1/1639* (2013.01)

(58) Field of Classification Search
CPC .... G02B 17/0621; G02B 7/182; G02B 17/02; G02B 7/198; G02B 27/04; G02B 27/027; G02B 27/0101; G02B 21/362; G02B 27/0172; G02B 21/22; G02B 27/0176; G02B 27/0149; G02B 27/01; G06F 1/1616; G06F 1/1601; G06F 1/16; G06F 1/1609; G06F 1/1639; H04N 5/7475; H04M 1/027; B60K 35/00; B60R 1/10; F41G 1/38; G03B 21/142; G03B 21/145; G03B 21/16; G03B 21/28; G01B 11/272; G03H 1/2205
USPC ........................................................ 359/859
See application file for complete search history.

(56) References Cited

U.S. PATENT DOCUMENTS

| | | | | |
|---|---|---|---|---|
| 3,949,767 A * | 4/1976 | Rose | ...................... | A45D 42/04 132/301 |
| 4,640,597 A * | 2/1987 | Okano | .................... | G03B 21/30 353/101 |
| 5,345,282 A * | 9/1994 | Ushiro | ................. | G03B 21/132 353/119 |
| 7,926,781 B2 * | 4/2011 | Wang | .................... | G06F 1/1616 248/351 |
| 8,172,410 B2 * | 5/2012 | Rummer | ................. | B60R 1/007 359/840 |
| 9,971,123 B2 * | 5/2018 | Chen | ..................... | B60K 37/00 |
| 2015/0316960 A1 * | 11/2015 | Tseng | ................... | A45C 13/005 359/822 |
| 2016/0062117 A1 * | 3/2016 | Imasaka | ............ | G02B 27/0101 345/7 |
| 2018/0348517 A1 * | 12/2018 | Chen | .................. | G02B 27/0149 |

* cited by examiner

Primary Examiner — William R Alexander
Assistant Examiner — Rahman Abdur
(74) *Attorney, Agent, or Firm* — Guice Patents PLLC

(57) ABSTRACT

The invention relates to a virtual display device including a fixed base, a reflective module and a magnification module, the feature is that the fixed base is connected to a back cover by a second shaft group of the magnification module to form a box body, the fixed base is used to store a reflector and a bracket for facilitate storage, the virtual display device is provided to enlarge images after being opened.

14 Claims, 12 Drawing Sheets

VIRTUAL DISPLAY DEVICE

BACKGROUND OF THE INVENTION a) Field of the Invention

The invention relates to a virtual display device and, more particularly, a virtual display device for facilitate storage, which is provided to enlarge images after being opened.

b) Description of Prior Art

Smart phones are powerful devices, with the technological development of internet and wireless communications, smart phones have gradually replaced many kinds of electronic devices. Not only receive external information at any time, smart phones may be also used as navigation devices, and also provided to exchange information with friends through internet. Although smart phones are quite convenient, their displays are small. Thus, the screen size of smart phones has gradually increased, but it is still limited.

In order to solve the problem, the industry has proposed various solutions continuously. As shown in FIG. 1, it is a mobile phone screen amplification projector of cited reference CN203608282U, which includes a projecting mirror 1 and a magnifying lens 2, a mirror 10 is set on the projection lens 1, the mirror 10 has a concave curvature for projecting the displayed images of the mobile phone T to the magnifying lens 2; the projecting mirror 1 is connected to a support shaft seat 11 for achieving opened or closed; the projecting mirror 1 receives images of the mobile phone T and reflects to the magnifying lens 2, the magnifying lens 2 is provided to enlarge the images of the mobile phone T for watching. The positive effect of the cited reference is to provide a mobile phone screen amplification projector for a user to amplify and display the image content of the mobile phone so that it is convenient to enjoy the screen content.

In most of the cited references, the technology of enlarging displayed images of mobile phones has already improved, but there are still the following drawbacks to be overcome, such as that the projection mirror and the magnifier cannot be expanded.

SUMARRY OF THE INVENTION

In view of this, the inventor finally completes the virtual display device of the present invention after numerous improvements, namely, the object of the present invention is to provide a virtual display device for facilitate storage, which is provided to enlarge images after being opened.

To achieve the above object according to the invention, the first embodiment of the virtual display device of the present invention, including:

a fixed base, a capacity space is set on it;

a reflective module, which includes a reflector, a first shaft group and a bracket, a side of the reflector is pivoted to the bracket, the reflector is a convex mirror, the reflector receives a projection image and reflects the projection image, the first shaft group is pivoted to the fixed base and the bracket;

a magnification module, which includes a magnification piece, a second shaft group and a back cover, the magnification piece is a concave mirror, the magnification piece receives a reflecting image from the reflector and magnifies the reflecting image, the second shaft group is pivoted on the fixed base;

the feature is:

the fixed base, which is connected to the back cover by the second shaft group to form a box body, the fixed base is provided to store the reflector and the bracket.

The above reflector, two corresponding fulcrum shafts are set on its one side, the two fulcrum shafts are correspondingly pivoted to two third shaft holes of the bracket, and the fulcrum shafts are corresponded to a fourth torsion spring, the fourth torsion spring provides an upward elasticity for the reflector to flip upwards.

The first shaft group, which includes a second torsion spring and the first positioning shaft, the second torsion spring provides an upward elasticity for the bracket to flip upwards.

The above second shaft group, which includes a shaft, a damper, two second positioning shafts and a third torsion spring, the damper is connected to a side of the shaft, the third torsion spring is set on the other side of the shaft, the second positioning shafts are passed through the fixed base and the shaft, the third torsion spring provides an upward elasticity for the magnification module to flip upwards, the damper is provided to let the flip speed of the magnification module become stable and constant.

A fixed element is set on the capacity space.

The above fixed base, a stand is set on its bottom side, the stand is provided to adjust the supporting angle of the fixed base according to needs of use.

An opening is set on the bracket.

A fastener is set on the above back cover, a notch and at least an operating element are set on the fixed base, the operating element is set on one side of the fixed base, and the fastener is fastened on the notch to fold the back cover.

The second embodiment of the virtual display device of the present invention, which includes:

a fixed base, a capacity space is set on it;

a reflective module, which includes a reflector, the reflector receives a projection image and reflects the projection image;

an magnification module, which includes a magnification piece and a back cover, the magnification piece is connected to the back cover, the magnification piece receives a reflecting image from the reflector and magnifies the reflecting image;

at least a bracket, which includes a bracket body, a first shaft group and a second shaft group, the first shaft group is set on one end of the bracket body, the second shaft group is set on the other end of the bracket body, the first shaft group is pivoted to the reflective module, the second shaft group is pivoted to the magnification module and the fixed base;

the feature is:

the back cover of the magnification module and the bracket rotate on the same axis when they flips, the fixed base is connected to the back cover by the second shaft group to form a box body, the inner space of the box body is provided to store the reflective module.

The reflector is a convex mirror.

The magnification piece is a concave mirror.

At least a first pivot mount is set on one side of the above reflective module, a first shaft hole is set on the first pivot mount, the first shaft group includes a first shaft and a first torsion spring, the first shaft is pivoted to the first shaft hole, the first torsion spring provides an upward elasticity for the reflective module flip upwards.

At least a second pivot mount is set on one side of the above magnification module, the second shaft group includes a shaft hole mount, a second shaft and a second torsion spring, a shaft support seat is set on one side of the fixed base, the second shaft is pivoted to the second pivot mount and the shaft support seat, the second torsion spring provides an upward elasticity for the bracket to flip upwards.

A stand is set on the bottom side of the above fixed base, the stand is provided to adjust the supporting angle of the fixed base according to needs of use.

A first buckle member is set on the other side of the above fixed base, a second buckle member is set on the other side of the magnification module, the second buckle member and the first buckle member are correspondingly buckled for fastening the back cover.

A fixed element is set on the capacity space.

The above fixed base is connected to the back cover and the bracket by the second shaft group to form a box body.

A first limiting slot is set on the above second pivot mount, a second limiting slot is set on the second shaft group, the first limiting slot is correspondingly connected to the second limiting slot, to thereby drive the bracket to rotate if the back cover is flipped to the predetermined position.

DETAILED DESCRIPTION OF THE INVENTION

Figure 1:
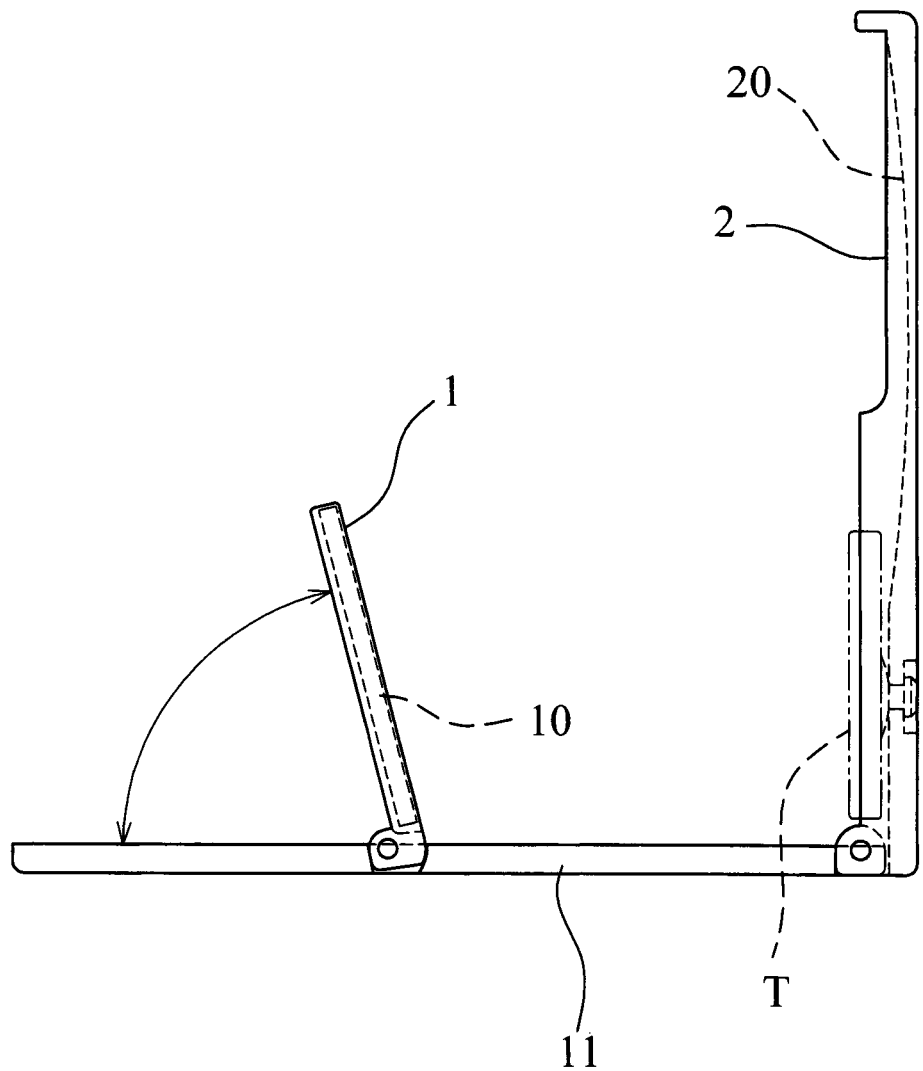
FIG. 1 is a schematic diagram of the prior art.
Figure 2:
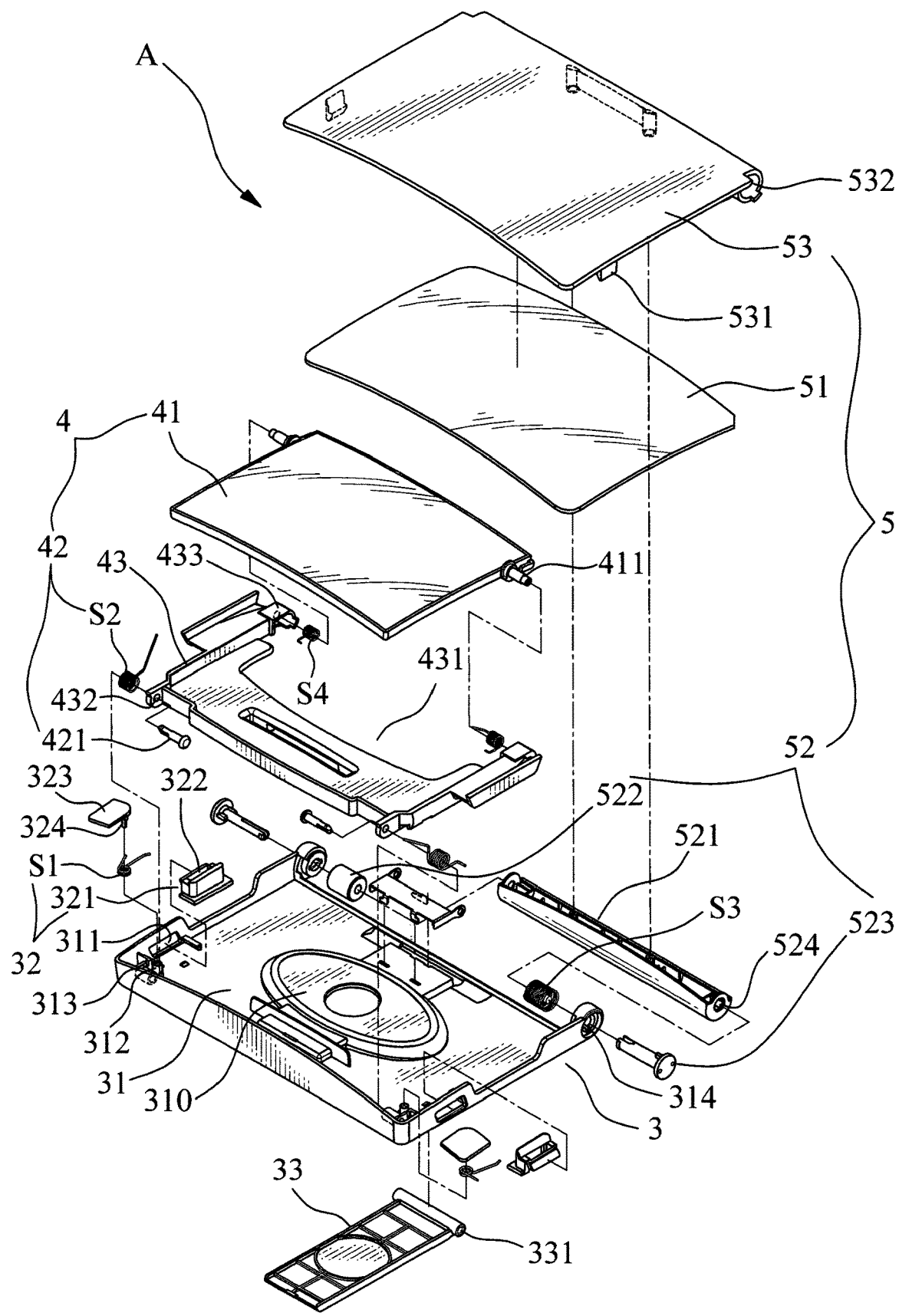
FIG. 2 is a three-dimensional exploded schematic diagram of the first embodiment of the present invention.
Figure 3:
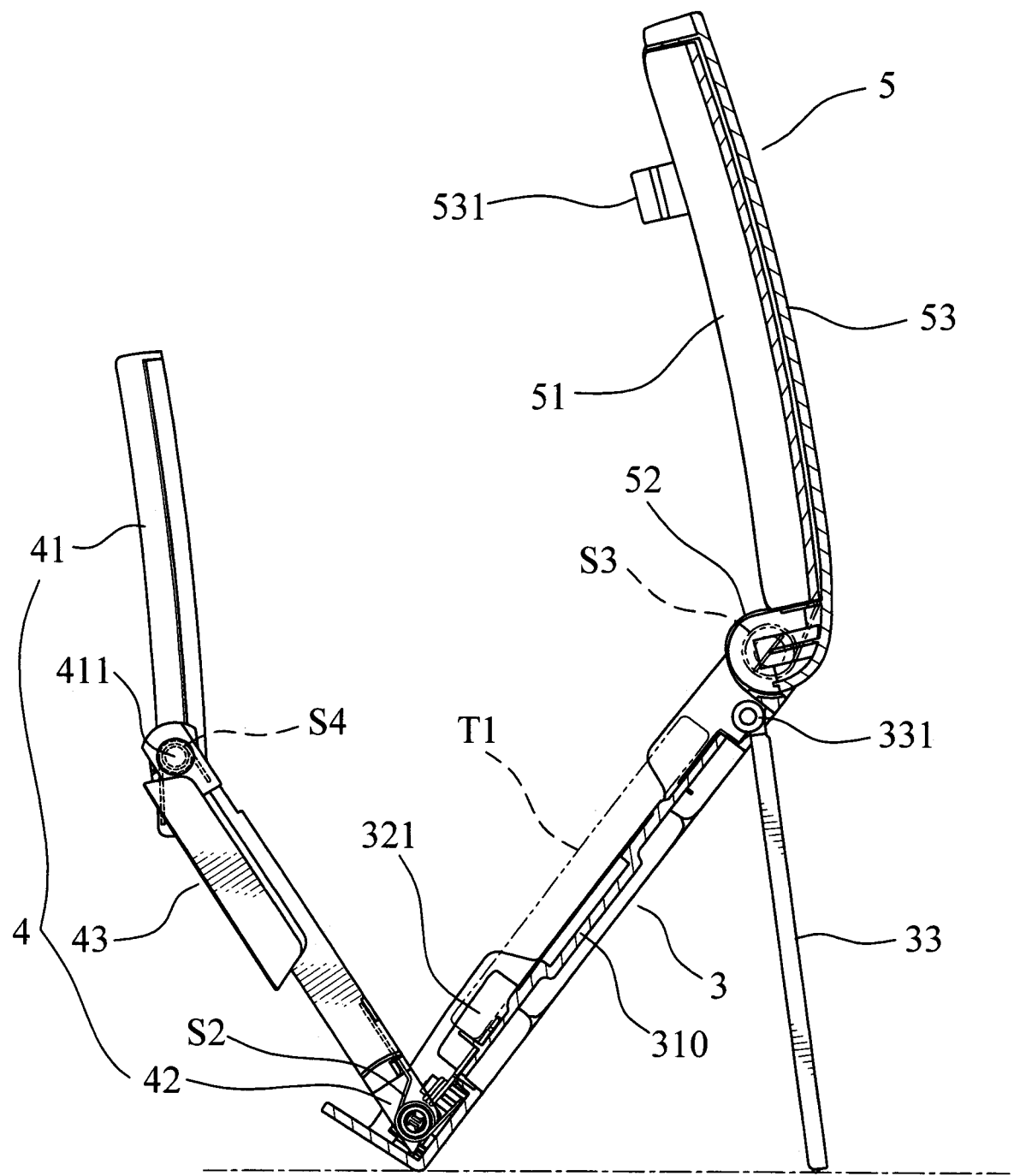
FIG. 3 is a schematic diagram of unfolding the first embodiment of the present invention.

Please refer to FIG. 2 to FIG. 5, the first embodiment of the virtual display device A of the present invention includes:

a fixed base 3, a capacity space 31 and at least an operating element 32, a fixed element 310 is set on the capacity space 31, the fixed element 310 is a magnet, a nano-magnet or a suction cup; the fixed element 310 is provided for a portable electronic device T1 to attach, the operating element 32 is set on a side of the fixed base 3, the operating element 32 includes a button 321 and a first torsion spring S1, the first torsion spring S1 pushes the button 321 by its elastic force;

a reflective module 4, which includes at least a reflector 41, a first shaft group 42 and a bracket 43, the reflector 41 is a convex mirror, a side of the reflector 41 is pivoted to the bracket 43, the reflector 41 receives a projection image and reflects the projection image, the first shaft group 42 is pivoted to the fixed base 3 and the bracket 43;

a magnification module 5, which includes a magnification piece 51, a second shaft group 52 and a back cover 53, the magnification piece 51 is a concave mirror, the magnification piece 51 receives a reflecting image from the reflector 41 and magnifies the reflecting image; the magnification piece 51 is connected to the back cover 53, the second shaft group 52 is pivoted on the fixed base 3. The virtual imaging is imaged by using a concave mirror, the imaging formula of the concave mirror is: $1/p+1/q=1/f$, wherein f is focal distance, q is object distance, p is image distance. Virtual images may be enlarged in a general magnification, and the distance of virtual images may also be become farer in the same ratio. The best condition of the magnification for users is approximately between four to six times. If magnification is too large, users may feel dizzy easily. In the best condition, the distance between virtual images and users' eye is larger than 1 meter, so the location of image should be in the rear of the magnification piece with distance approximately 1 meter. The magnification piece 51 receives the reflected images of the reflector 41 and magnifies the reflected images. The back cover 53 is connected to the second shaft group 52, the second shaft group 52 is set between the magnification piece 51 and the fixed base 3;

the feature is:

the fixed base 3, which is connected to the back cover 53 by the second shaft group 52 to form a box body, the fixed base 3 is provided to store the reflector 41 and the bracket 43.

The above portable electronic device T1 is a smart phone, a tablet PC or an electronic device with a display.

The above fixed base 3, a button hole 311, a first hole column 312 and a second hole column 313 are set on its one side, the button 321 is set in the button hole 311, the first torsion spring S1 pushes the button 321, the first torsion S1 is located by a shaft piece 323, a location column 324 is set on the shaft piece 323, the location column 324 is inserted into the first hole column 312 after being passed through the first torsion spring S1, and two corresponding first shaft holes 314 are set on the other side of the fixed base 3.

The above first shaft group 42, which includes at least a second torsion spring S2 and a first positioning shaft 421, two corresponding second shaft holes 432 are set on a side of the bracket 43, one end of the first positioning shaft 421 is passed through the second shaft hole 432 and the second torsion spring S2 and fixed to the second hole column 313, two third shaft holes 433 are set on the other side of the bracket 43, the opening 431 is provided for a user to operate the portable electronic device T1 through the opening 431, the second torsion spring S2 provides an upward elasticity for the bracket 43 to flip upwards.

The above back cover 53, at least a fastener 531 is set on it, a notch 322 is set on the button 321 of the fixed base 3.

Figure 4:
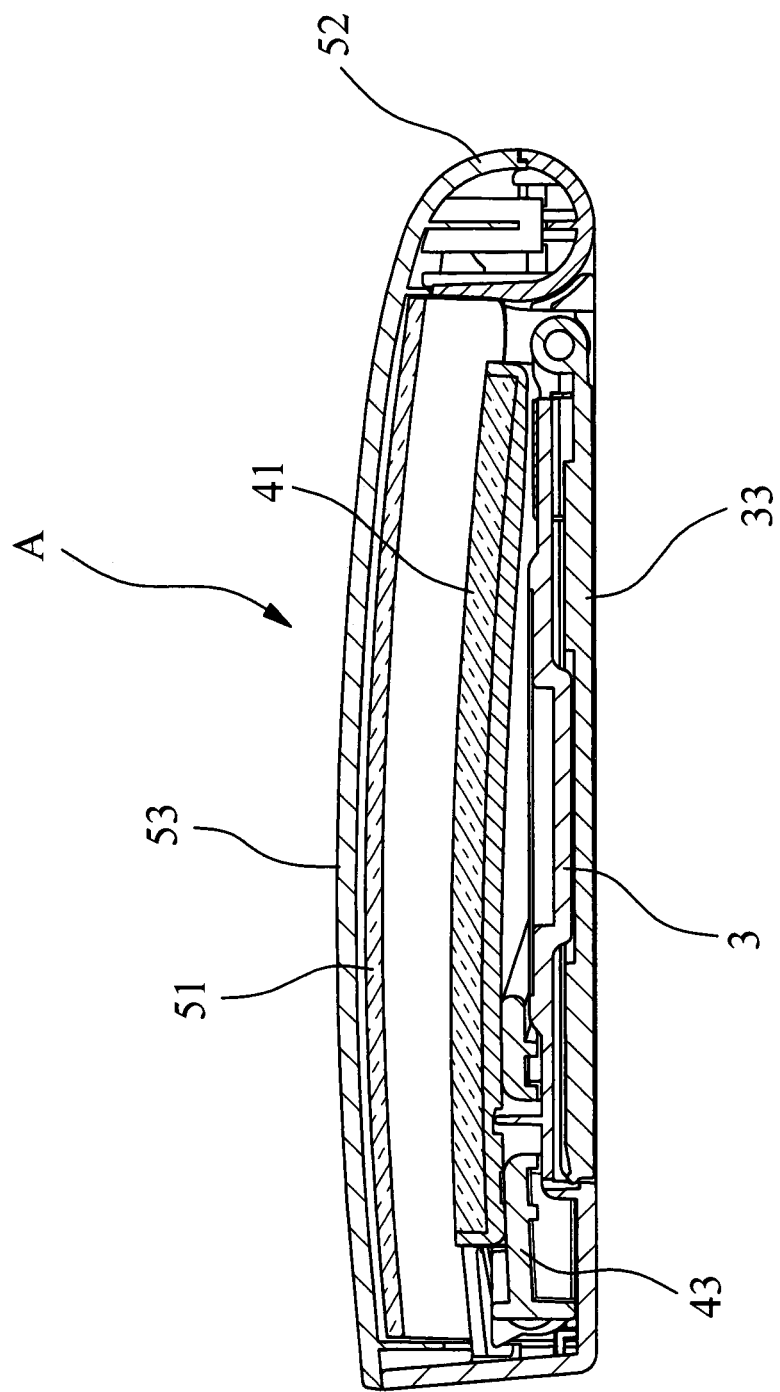
FIG. 4 is a schematic diagram of folding the first embodiment of the present invention.
Figure 5:
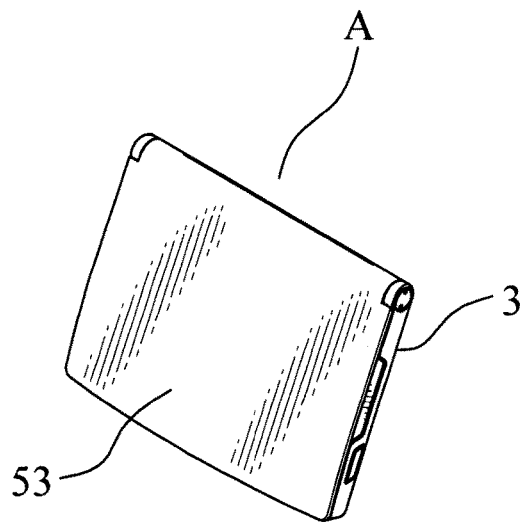
FIG. 5 is a three-dimensional schematic diagram of appearance of the first embodiment of the present invention.

When the back cover 53 is folded, the fastener 531 is fastened on the notch 322 to fix the back cover 53 (as shown in FIG. 4).

The above fixed base 3, which is pivoted to a pivot shaft 331 on one end of a stand 33, the stand 33 is provided to adjust the supporting angle of the fixed base 3 according to needs of use, so that users may see the enlarged image projected in the air at the best viewing angle.

The above reflector 41, two corresponding fulcrum shafts 411 are set on its one side, the fulcrum shafts 411 are pivoted to the third shaft holes 433, and the fulcrum shafts 411 are corresponded to a fourth torsion spring S4, the fourth torsion spring S4 provides an upward elasticity for the reflector 41 to flip upwards.

Figure 6:
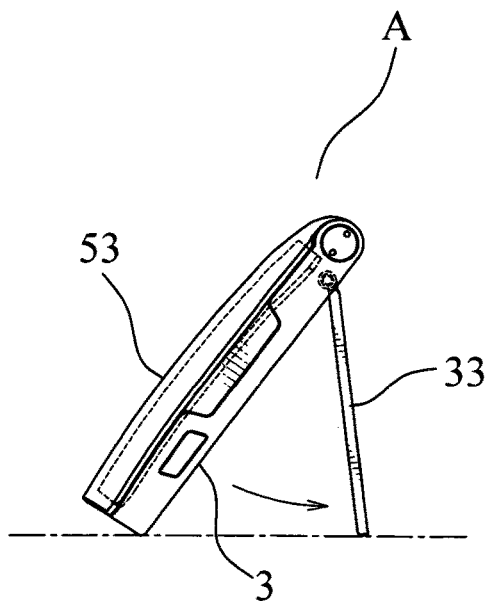
FIG. 6 is a schematic diagram (1) of operation of the first embodiment of the present invention.
Figure 7:
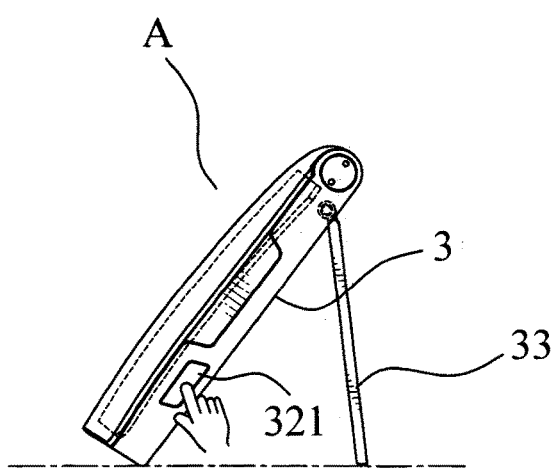
FIG. 7 is a schematic diagram (2) of operation of the first embodiment of the present invention.
Figure 8:
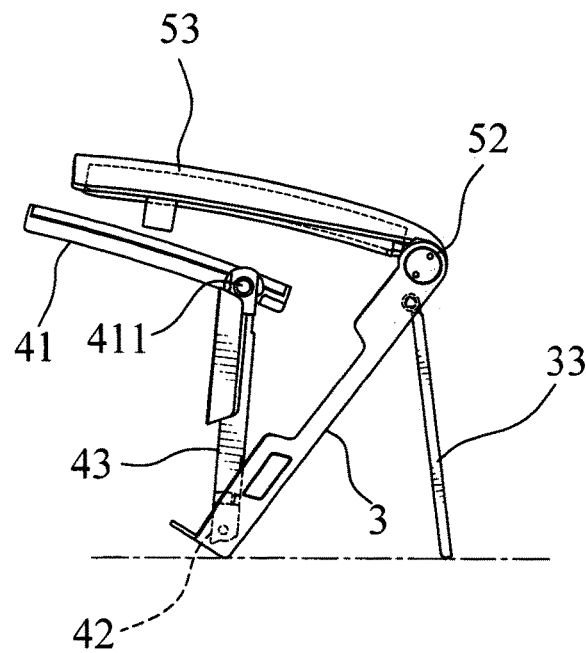
FIG. 8 is a schematic diagram (3) of operation of the first embodiment of the present invention.

As shown in FIG. 2, FIG. 3 and FIG. 5 to FIG. 8, it is the first embodiment of the present invention. In the operation of opening it to a watching position from the folded mode, first, expanding the stand 33 on the bottom of the fixed base 3 outwards and adjusting the supporting angle of the fixed base 3 according to needs of use (as shown in FIG. 6), and then pressing the button 321 to let the fastener 531 escape from the notch 322 (as shown in FIG. 7), so that the back cover 53, the bracket 43 and the reflector 41 are flipped and expanded simultaneously (as shown in FIG. 8), a shaft pipe 532 is set on one side of the back cover 53, the second shaft group 52 is set in the shaft pipe 532, the second shaft group 52 includes a shaft 521, a damper 522, two second positioning shafts 523 and a third torsion spring S3, the damper 522 is connected to a side of the shaft 521, the third torsion spring S3 is set on the other side of the shaft 521, the second positioning shafts 523 are provided to pass through the first shaft hole 314 of the fixed base 3 and the positioning shaft holes 524 on two ends of the shaft 521, the second positioning shaft 523 is used to pass through the first shaft hole 314 of the fixed base 3 and the positioning shaft hole 524 on two sides of the shaft 521, the second shaft group 52 is provided for the fixed base 3 and the back cover 53 to pivot, the third torsion spring S3 provides an upward elasticity for the magnification module 5 to flip upwards, the damper 522 is provided to let the flip speed of the magnification module 5 become stable and constant.

Figure 9:
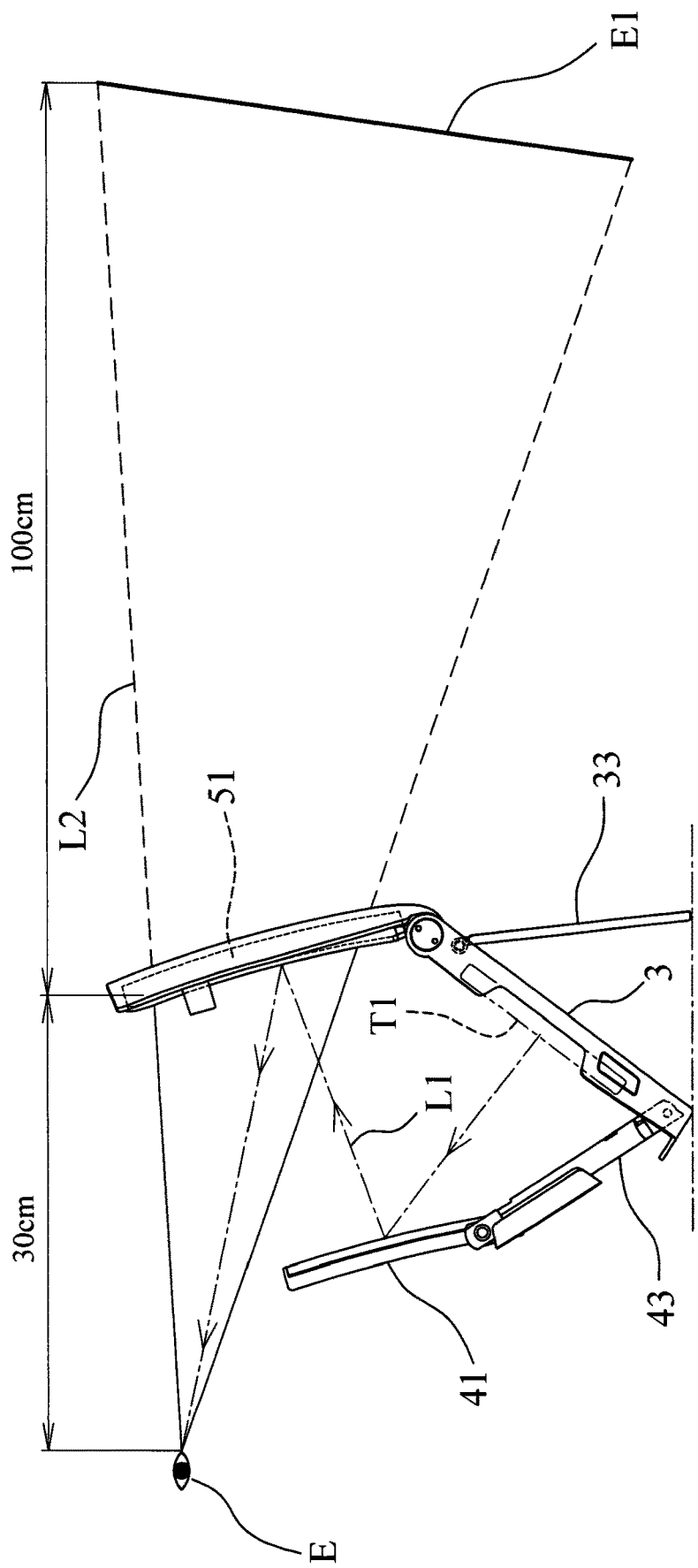
FIG. 9 is a schematic diagram of optical path of the first embodiment of the present invention.
Figure 10:
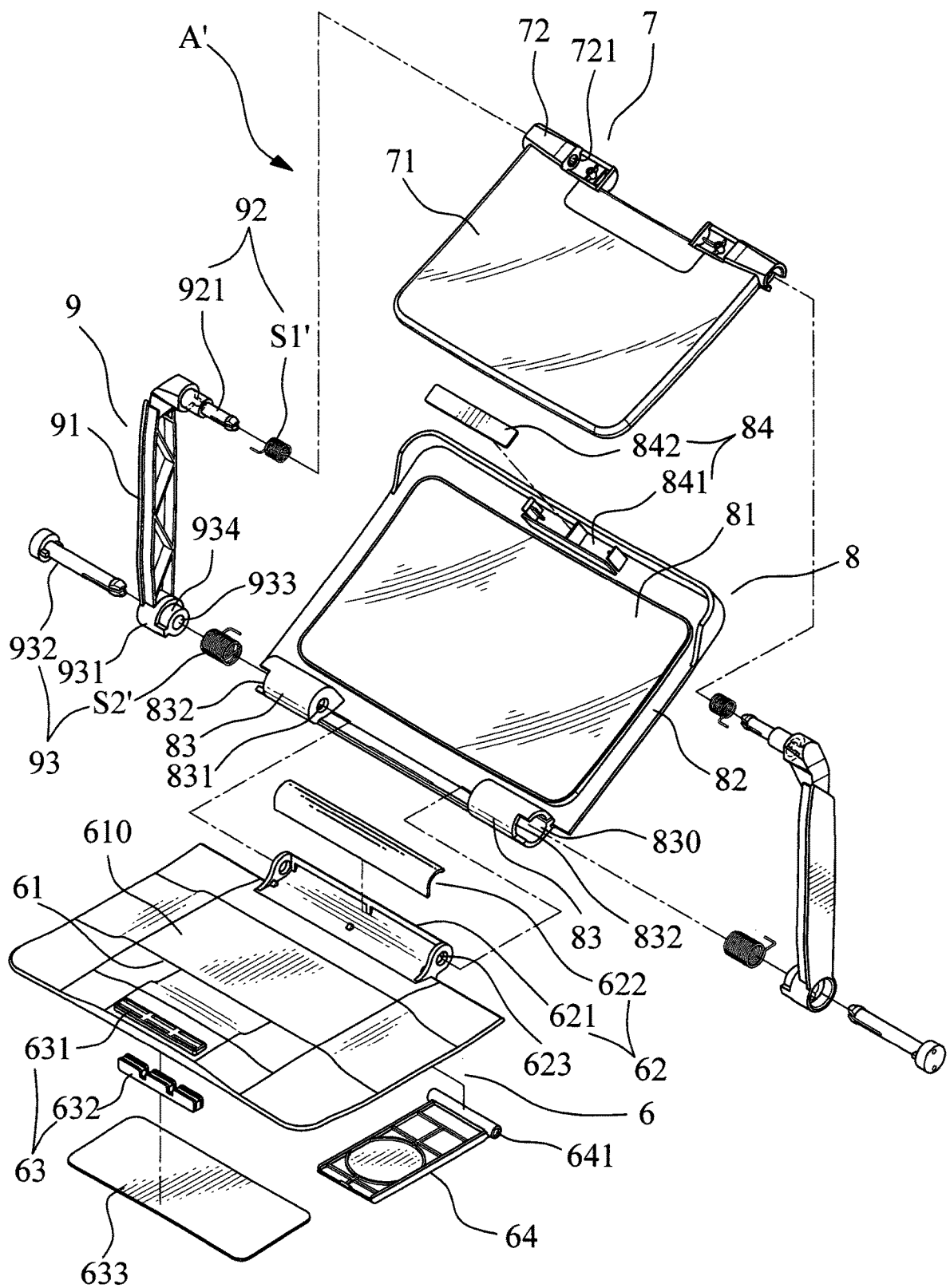
FIG. 10 is a three-dimensional exploded schematic diagram of the second embodiment of the present invention.

As shown in FIG. 9, it is the schematic diagram of optical path of the first embodiment of the present invention, wherein the image displayed on the screen of the portable electronic device T1 passes through the reflection optical path L1 of the reflector 41, so that the user's eye E could receive the reflected image of the reflector 41 through the magnification piece 51, the user could see the enlarged image in the far imaging area E1 through the magnification optical path L2.

Please refer to FIG. 10 to FIG. 13, the second embodiment of the virtual display device A of the present invention includes:

a fixed base 6, a capacity space 61 is set on it, a fixed element 610 is set on the capacity space 61, a shaft support seat 62 is set on one side of the fixed base 6, the shaft support seat 62 includes a seat body 621 and a seat cover 622, a through holes 623 is set on two sides of the seat body 621, a first buckle member 63 is set on the other side of the fixed base 6, the first buckle member 63 includes a first placing groove 631 and a first buckle piece 632, the first buckle piece 632 is placed in the first placing groove 631;

a reflective module 7, which includes a reflector 71, the reflector 71 is a convex mirror, a side of the reflector 41 is pivoted to the bracket 43, the reflector 71 receives a projection image and reflects the projection image; at least a first pivot mount 72 is set on one side of the reflective module 7, a first shaft hole 721 is set on the first pivot mount 72, the reflector 71 receives a projection image and reflects the projection image;

a magnification module 8, which includes a magnification piece 81 and a back cover 82, the magnification piece 81 is a concave mirror, the magnification piece 81 receives images reflected from the reflector 71 and enlarges the reflected images, the magnification piece 81 is connected to the back cover 82. At least a second pivot mount 83 is set on one side of the magnification module 8, a containing hole 831, a second shaft hole 831 and a first limiting slot 832 are set on the second pivot mount 83, the containing hole 830 is communicated with the second shaft hole 831 and on the same centerline, the first limiting slot 831 is located on the edge of the containing hole 830, a second buckle member 84 is set on the other side of the magnification module 8, the second buckle member 84 includes a second placing groove 841 and a second buckle piece 842, the second buckle piece 842 is placed in the second placing groove 841. The imaging formula of the magnification module 8 is imaged by using a concave mirror. The imaging formula of the concave mirror is: $1/p + 1/q = 1/f$, wherein f is focal distance, q is object distance, p is image distance. Virtual images may be enlarged in a general magnification, and the distance of virtual images may also be become farer in the same ratio. The best condition of the magnification for users is approximately between four to six times. If magnification is too large, users may feel dizzy easily. In the best condition, the distance between virtual images and users' eye is larger than 1 meter, so the location of image should be in the rear of the magnification piece with distance approximately 1 meter. The magnification piece 81 receives the reflected images of the reflector 71 and magnifies the reflected images.

At least a bracket 9, which includes a bracket body 91, a first shaft group 92 and a second shaft group 93, the first shaft group 92 is set on one end of the bracket body 91, the first shaft group 92 includes a first shaft 921 and a first torsion S1', the first shaft 921 is pivoted to the first shaft hole 721 of the first pivot mount 72 after passing through the first torsion spring S1', the first torsion spring S1' provides an upward elasticity for the reflective module 7 flip upwards; the second shaft group 93 is set on the other end of the bracket body 91, the second shaft group 93 includes a shaft hole mount 931, a second shaft 932 and a second torsion spring S2', a shaft hole 933 and a second limiting slot 934 are set on the shaft hole mount 931, the second shaft 932 is pivoted to the second shaft hole 831 of the second pivot mount and the through hole 623 of the fixed base 6 after passing through the shaft hole 933 and the second torsion spring S2', the second torsion spring S2' provides an upward elasticity, so that the magnification module 8a and the bracket 9 could flip upwards;

the feature is:

the back cover 82 of the magnification module 8 and the bracket 9 rotate on the same axis when they flips, the fixed base 6 is connected to the back cover 82 by the second shaft group 93 to form a box body, the inner space A1' of the box body is provided to store the reflective module 7.

The fixed element 610 is a magnet, a nano-magnet or a suction cup, the fixed element 610 is provided for a portable electronic device T1 to attach.

The above portable electronic device T1 is a smart phone, a tablet PC or an electronic device with a display.

The first buckle piece 632 of the above first buckle member 63 is a magnetic element, a ferromagnetic element or a notch, the first buckle member 63 is set on the other side of the fixed base 6, a bottom cover 633 is set on a position of the bottom of the fixed base 6 corresponded to the first buckle member 63.

Figure 12:
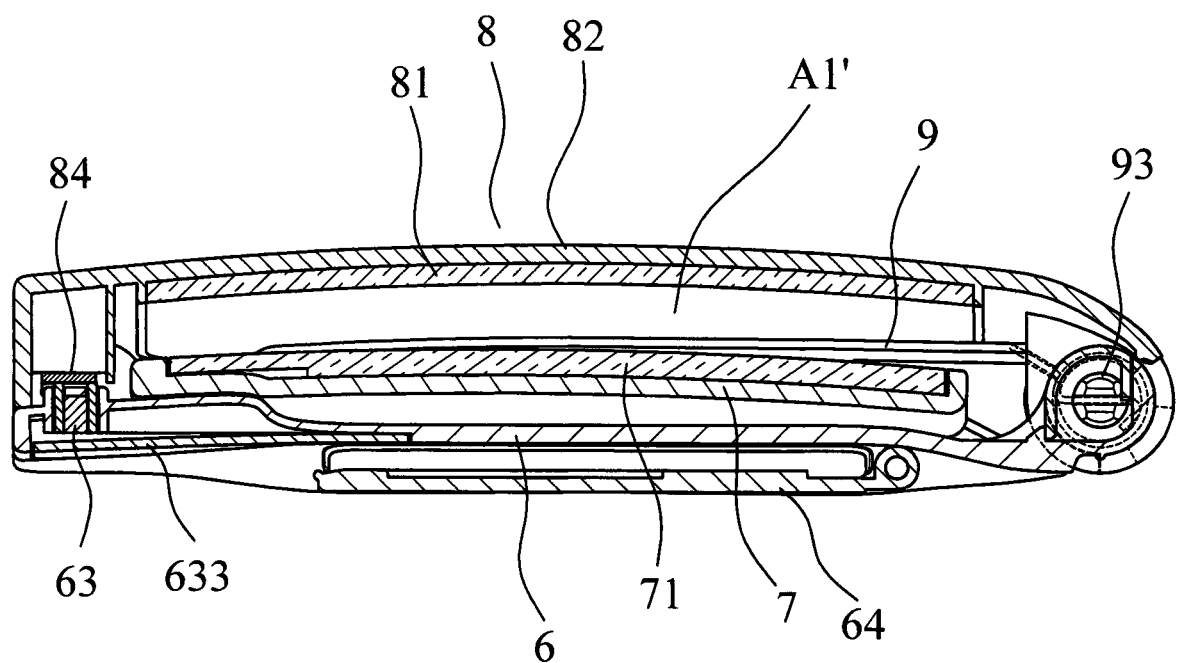
FIG. 12 is a schematic diagram of folding the second embodiment of the present invention.
Figure 13:
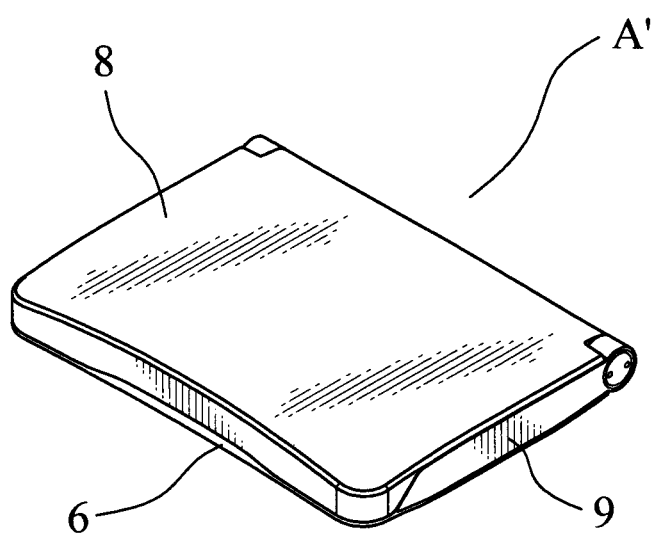
FIG. 13 is a three-dimensional schematic diagram of appearance of the second embodiment of the present invention.

The second buckle piece 842 of the above second buckle member 84 is a magnetic element, a ferromagnetic element or a fastener, if the back cover 82 is covered on the fixed base 6, the second buckle member 84 and the first buckle member 63 are correspondingly buckled to fasten the back cover 82 (as shown in FIG. 12).

The first limiting slot 832 of the above second pivot mount 83 is connected to the second limiting slot 924 of the second shaft group correspondingly, to thereby drive the bracket 9 to rotate if the back cover 82 is flipped upwards to the predetermined position.

The above fixed base 6 is connected to the back cover 82 and the bracket 9 by the second shaft group 93 to form a box body.

The above fixed base 6, which is pivoted to a pivot shaft 641 on one end of a stand 64, the stand 64 is provided to adjust the supporting angle of the fixed base 6 according to needs of use, so that users may see the enlarged image projected in the air at the best viewing angle.

Figure 11:
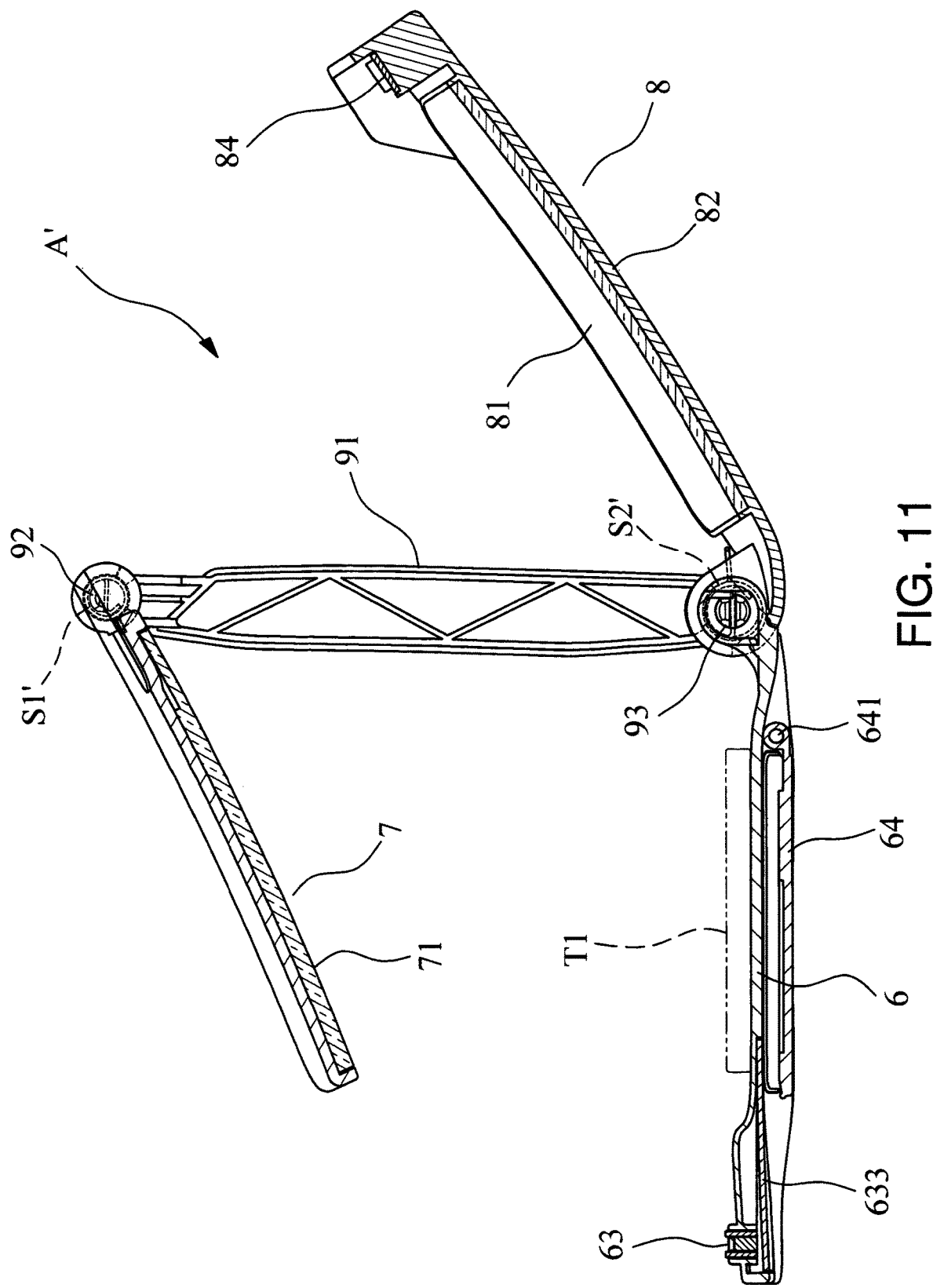
FIG. 11 is a schematic diagram of unfolding the second embodiment of the present invention.
Figure 14:
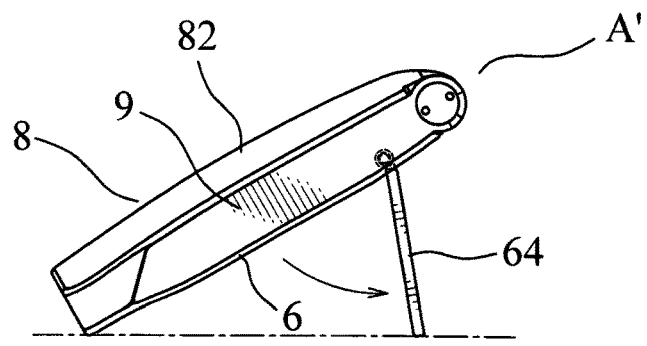
FIG. 14 is a schematic diagram (1) of operation of the second embodiment of the present invention.
Figure 15:
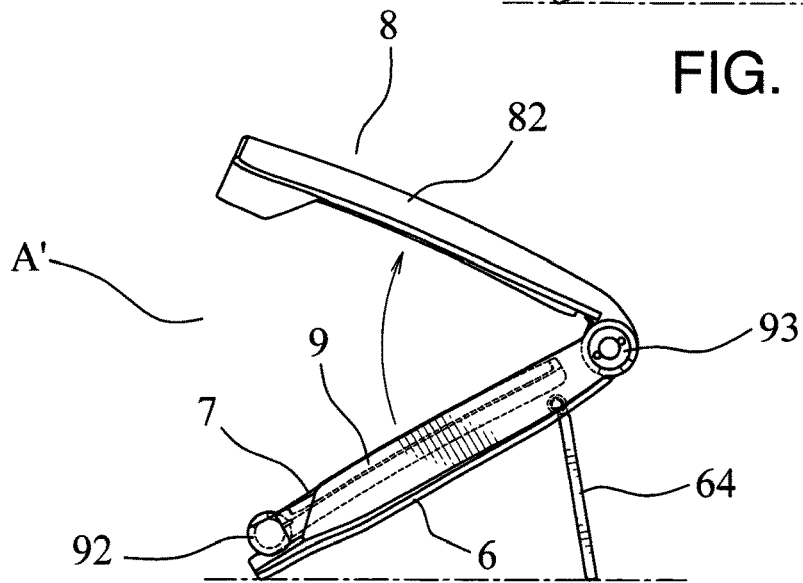
FIG. 15 is a schematic diagram (2) of operation of the second embodiment of the present invention.
Figure 16:
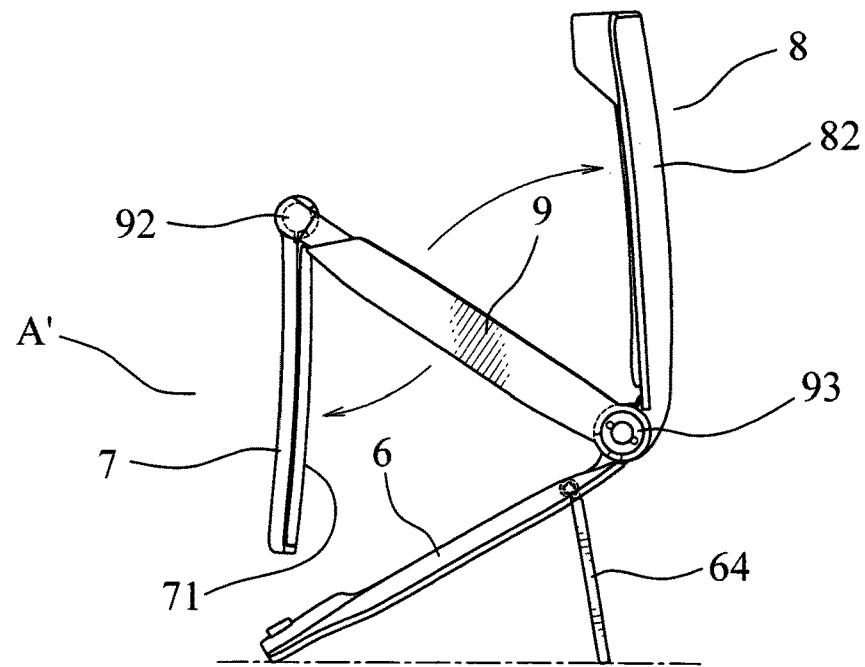
FIG. 16 is a schematic diagram (3) of operation of the second embodiment of the present invention.
Figure 17:
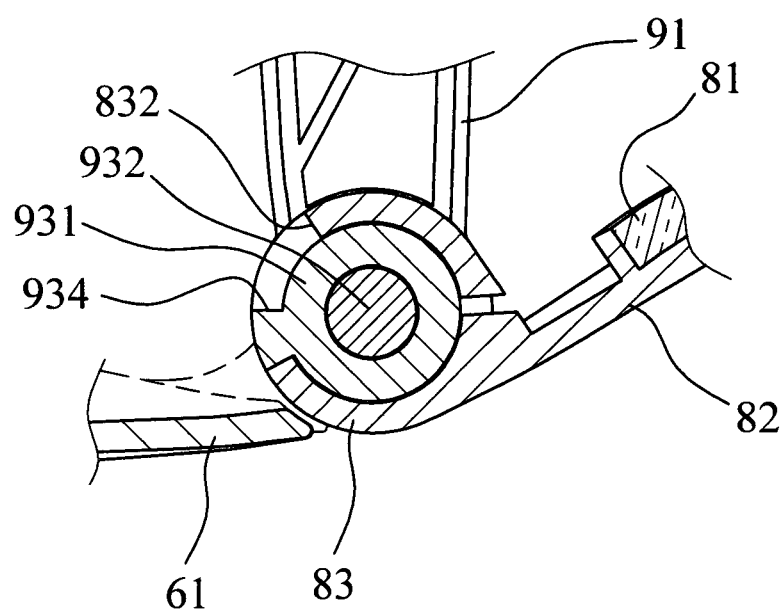
FIG. 17 is a schematic diagram of the first limiting slot embedded to the second limiting slot in the second embodiment of the present invention.

As shown in FIG. 10, FIG. 11 and FIG. 14 to FIG. 17, which is the second embodiment of the present invention, in the operation of opening it to a watching position from the folded mode (as shown in FIG. 14), first, flipping the back cover 82 of the magnification module 8 upwards by fingers, since the flipping force is far greater than the buckling force between the second buckle member 84 and the first buckle member 63, the back cover 82 could be easily flipped (as shown in FIG. 15), so that the back cover 82 is no longer buckled, the second torsion spring S2' could flip the back cover 82 upwards by its elasticity, the first limiting slot 832 wedges one side of the second limiting slot 934 when it is turned to the predetermined position (for example, rotating to the angle of 45 degree), at this time, the bracket 9 is driven to rotate upwards by the elasticity of the second torsion spring S2' simultaneously. With the rotation of the bracket 9 and the elasticity of the first torsion spring S1', the reflector 71 is flipped to the opened position (as shown in FIG. 11, FIG. 16).

If a user want to fold the present invention, pressing the back cover 82 by fingers first, when it is turned to the predetermined position (for example, rotating to the angle of 45 degree), the first limiting slot 832 does not wedge the second limiting slot 934, the reflective module 7 is folded with the rotation of the bracket 9, the first torsion S1' and the second torsion spring S2' become compressed, and the second buckle member 84 and the first buckle member 63 are buckled together when the back cover 82 is flipped to the folded position (as shown in FIG. 12). The fixed base 6 is connected to the back cover 82 and the bracket 9 by the second shaft group 93 to form a box body, the inner space A1' of the box body is provided to store the reflector module 7.

Figure 18:
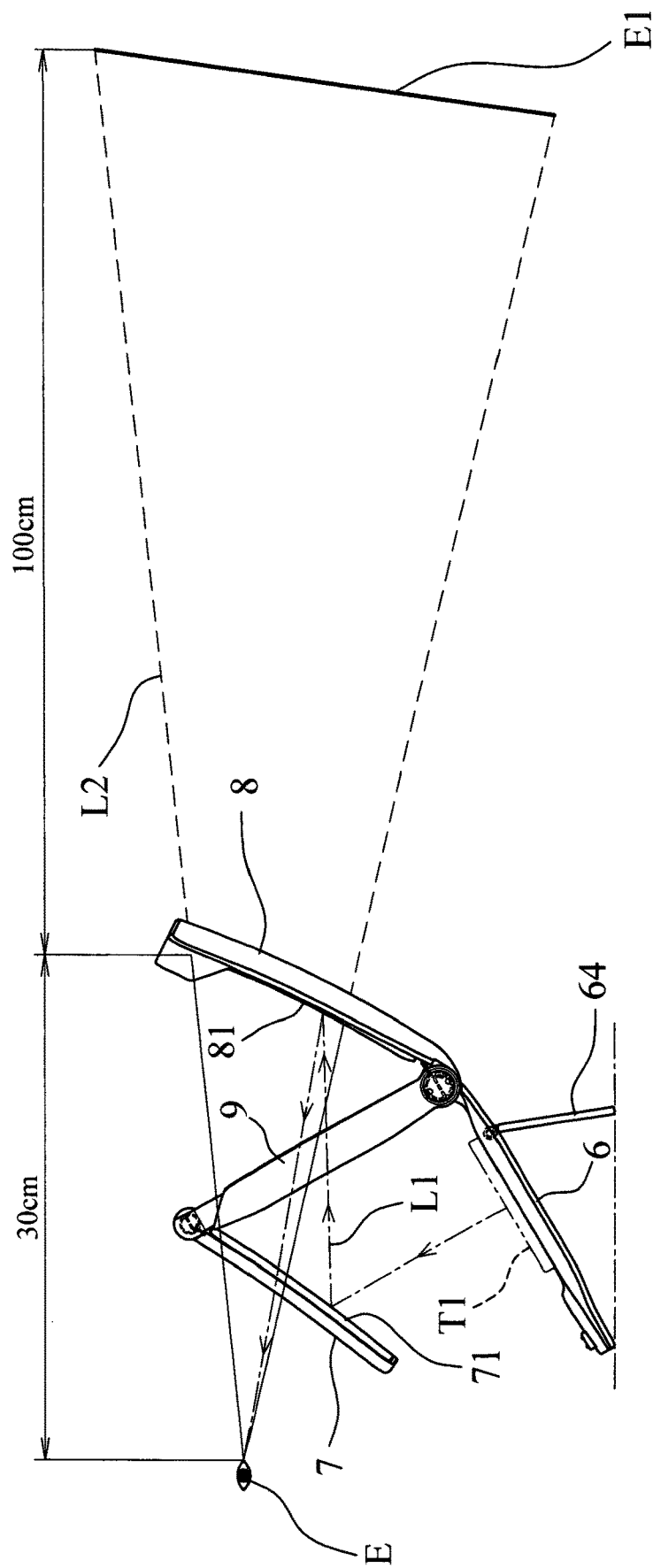
FIG. 18 is a schematic diagram of optical path of the second embodiment of the present invention.

Please refer to FIG. 18, which is a schematic diagram of the second embodiment of the present invention, wherein the image displayed on the screen of the portable electronic device T1 passes through the reflection optical path L1 of the reflector 71, so that the user's eye E could receive the reflected image of the reflector 71 through the magnification piece 81, the user could see the enlarged image in the far imaging area E1 through the magnification optical path L2.

What is claimed is:

1. A virtual display device, which includes:
   a reflective module, which includes a reflector, a first shaft group and a bracket, one end of the bracket is pivotally connected to the reflector, the reflector receives a projection image and reflects the projection image, end of the bracket is pivotally connected to a fixed base via the first shaft group;
   a magnification module, which includes a magnification piece, a second shaft group and a back cover, the magnification piece is connected to the back cover, the magnification piece receives a reflecting image from the reflector and magnifies the reflecting image, the second shaft group is pivoted on the fixed base;
   wherein the fixed base is connected to the back cover by the second shaft group to form a box body, the fixed base is provided to store the reflector and the bracket;
   wherein two corresponding fulcrum shafts are set on one side of the reflector, the two fulcrum shafts are correspondingly pivoted to two third shaft holes of the bracket, and the fulcrum shafts are corresponded to a fourth torsion spring, the fourth torsion spring provides an upward elasticity for the reflector to flip upwards;
   wherein the first shaft group includes a second torsion spring and a first positioning shaft, the second torsion spring provides an upward elasticity for the bracket to flip upwards;
   wherein the second shaft group includes a shaft, a damper, two second positioning shafts and a third torsion spring, the damper is connected to a side of the shaft, the third torsion spring is set on the other side of the shaft, the second positioning shafts are passed through the fixed base and the shaft, the third torsion spring provides an upward elasticity for the magnification module to flip upwards, the damper is provided to let the flip speed of the magnification module become stable and constant.

2. The virtual display device as claimed in claim 1, wherein the reflector is a convex mirror.

3. The virtual display device as claimed in claim 1, wherein the magnification piece is a concave mirror.

4. The virtual display device as claimed in claim 1, wherein a fixed element is set on the capacity space.

5. The virtual display device as claimed in claim 1, wherein a stand is set on the bottom side of the fixed base, the stand is provided to adjust the supporting angle of the fixed base.

6. The virtual display device as claimed in claim 1, wherein an opening is set on the bracket.

7. The virtual display device as claimed in claim 1, wherein a fastener is set on the back cover, a notch and at least an operating element are set on the fixed base, the operating element is set on one side of the fixed base, the fastener is fastened on the notch to fold the back cover.

8. A virtual display device, which includes:
   a fixed base, a capacity space is set on it;
   a reflective module, which includes a reflector, the reflector receives a projection image and reflects the projection image;
   a magnification module, which includes a magnification piece and a back cover, the magnification piece is connected to the back cover, the magnification piece receives a reflecting image from the reflector and magnifies the reflecting image; and
   at least a bracket, which includes a bracket body, a first shaft group and a second shaft group, the first shaft group is set on one end of the bracket body, the second shaft group is set on the other end of the bracket body, the first shaft group is pivoted to the reflective module, the second shaft group is pivoted to the magnification module and the fixed base;

wherein the back cover of the magnification module and the bracket rotate on the same axis when they flips, the fixed base is connected to the back cover by the second shaft group to form a box body, the inner space of the box body is provided to store the reflective module;

wherein at least a first pivot mount is set on one side of the reflective module, a first shaft hole is set on the first pivot mount, the first shaft group includes a first shaft and a first torsion spring, the first shaft is pivoted to the first shaft hole, the first torsion spring provides an upward elasticity for the reflective module to flip upwards;

wherein at least a second pivot mount is set on one side of the magnification module, the second shaft group includes a shaft hole mount, a second shaft and a second torsion spring, a shaft support seat is set on a side of the fixed base, the second shaft pivotally connects the second pivot mount and the shaft support seat, the second torsion spring provides an upward elasticity for the bracket to flip upwards;

wherein a stand is set on the bottom side of the fixed base, the stand is provided to adjust the supporting angle of the fixed base.

9. The virtual display device as claimed in claim 8, wherein the reflector is a convex mirror.

10. The virtual display device as claimed in claim 8, wherein the magnification piece is a concave mirror.

11. The virtual display device as claimed in claim 8, wherein a first buckle member is set on the other side of the fixed base, a second buckle member is set on the other side of the magnification module, the second buckle member and the first buckle member are correspondingly buckled to fasten the back cover.

12. The virtual display device as claimed in claim 8, wherein a fixed element is set on the capacity space.

13. The virtual display device as claimed in claim 8, wherein the fixed base is connected to the back cover and the bracket by the second shaft group to form a box body.

14. The virtual display device as claimed in claim 8, wherein at least a second pivot mount is set on one side of the magnification, a first limiting slot is set on the second pivot mount, a second limiting slot is set on the second shaft group, the first limiting slot is correspondingly connected to the second limiting slot, to thereby drive the bracket to rotate if the back cover is flipped upwards to the predetermined position.

* * * * *